United States Patent [19]

Brewer

[11] Patent Number: 4,972,596
[45] Date of Patent: Nov. 27, 1990

[54] TRAILER MEASURING SYSTEM

[76] Inventor: Aubrey W. Brewer, 6927 Twin Creek Rd., Knoxville, Tenn. 37920

[21] Appl. No.: 296,948

[22] Filed: Jan. 17, 1989

[51] Int. Cl.$^5$ .................................................. G01C 5/04
[52] U.S. Cl. ........................................ 33/367; 33/377; 33/370
[58] Field of Search ................ 33/367, 370, 377, 378, 33/365, 354, 333, 335

[56] References Cited

U.S. PATENT DOCUMENTS

| | | |
|---|---|---|
| 386,924 | 7/1888 | Kegel . |
| 451,680 | 5/1891 | Gamble . |
| 915,084 | 3/1909 | Eberhard . |
| 2,532,883 | 12/1950 | Bennett et al. . |
| 2,971,264 | 2/1961 | Cowan ................................. 33/367 |
| 3,015,167 | 1/1962 | Chapman . |
| 3,093,919 | 6/1963 | Holtz ............................. 33/493 X |
| 3,132,428 | 5/1964 | Haissig et al. . |
| 3,137,091 | 6/1964 | Clare et al. . |
| 3,144,234 | 8/1964 | Artmann . |
| 3,310,880 | 3/1967 | Watts . |
| 3,680,216 | 8/1972 | Hallanger . |
| 3,768,766 | 10/1973 | Bain . |
| 3,910,576 | 10/1975 | Leonhart . |
| 4,169,320 | 10/1979 | Bennett ............................... 33/367 |
| 4,581,931 | 4/1986 | Robotti ........................... 33/367 X |
| 4,686,773 | 8/1987 | Brewer ............................... 33/367 |

FOREIGN PATENT DOCUMENTS

| | | | |
|---|---|---|---|
| 2483 | 6/1931 | Australia .............................. 33/367 |
| 300826 | 9/1917 | Fed. Rep. of Germany ........ 33/367 |
| 0035664 | 3/1977 | Japan .................................... 33/367 |

Primary Examiner—Harry N. Haroian
Attorney, Agent, or Firm—Pitts and Brittian

[57] ABSTRACT

A trailer measuring system (10') for leveling a trailer during setup and for indicating deviations from an initial position of level of a trailer is provided. The device (10') includes a reservoir (16') and a plurality of measuring tubes (18') which can be secured to the frame (12) of a trailer (14) at horizontally spaced locations. Fluid communication is provided between the measuring tubes (18') proximate their lower end portions by tubing (20') and between their upper end portions by tubing (22) which connects the measuring tubes (18') in series or series/parallel to form a closed system. Fluid communication is selectively provided between the upper and lower end portions of the measuring tubes (18') and the upper and lower portions of the reservoir (16'), respectively. Indicia (38') is provided proximate the measuring tubes (18') along their lengths such that a user can discern, from the level of liquid in each tube, when the trailer is level, as well as deviations from an initial position of level of the trailer proximate the location of each individual measuring tube (18').

1 Claim, 4 Drawing Sheets

4,972,596

TRAILER MEASURING SYSTEM

TECHNICAL FIELD

This invention relates to a system for measuring the level of a trailer, and more particularly to a system for facilitating the initial leveling of a trailer during setup and for indicating deviations from such initial position of level.

BACKGROUND ART

There are numerous applications where it is desirable to position a trailer such that the floor of the trailer is level with respect to the ground below it. Mobile homes, sometimes called house trailers, are the most common example. Mobile office space type trailers are another example. Obviously, in most cases it is equally desirable to maintain this position of level.

Typically, when a trailer is installed in a permanent, or semi-permanent, location, it is leveled by placing the base or frame of the trailer on pillars spaced along the frame between the frame and the ground or other surface beneath the trailer. With mobile homes, the pillars typically comprise concrete blocks. Conventional methods typically used during the initial leveling process can be quite complex, requiring the assistance of technicians skilled in the use of specialized instruments such as a surveyor's transit. An important feature of the present invention is its suitability for use by relatively unskilled persons.

With the passage of time, there is a tendency for trailers to deviate from the initial position of level due to settling of the surface beneath the trailer and other causes. This is a particular problem with very long and very heavy trailers such as mobile homes. In addition to the obvious aesthetic benefits of maintaining the level of a trailer which is used as a dwelling or office, it is important to maintain the level to keep doors and windows in proper alignment. It is also advantageous to maintain the level of the floor beneath level-sensitive appliances such as refrigerators, washing machines, and clothes dryers. The system of the present invention includes a feature whereby deviations from an initial position of level, as well as the corrections required to correct for such deviations, are visually indicated.

Numerous liquid leveling systems have been developed in the past. Known prior art is illustrated in the following United States patents:

| U.S. PAT. NO. | INVENTOR | ISSUE DATE |
| --- | --- | --- |
| 386,924 | A. Kegel | July 31, 1888 |
| 451,680 | A. Gamble | May 5, 1891 |
| 915,084 | R. Eberhard | March 16, 1909 |
| 2,532,883 | P. L. Bennett, et al. | December 5, 1950 |
| 3,015,167 | J. M. Chapman | January 2, 1962 |
| 3,132,428 | H. O. Haissig, et al. | January 12, 1962 |
| 3,137,091 | H. Clare, et al. | June 16, 1964 |
| 3,144,234 | K. Artmann | August 11, 1964 |
| 3,310,880 | A. W. Watts | March 28, 1967 |
| 3,680,216 | L. W. Hallanger | August 1, 1972 |
| 3,768,766 | A. O. Bain | October 30, 1973 |
| 3,910,576 | X. Leonhart | October 7, 1975 |

While these leveling systems, as a general rule, incorporate one or more liquid containing members, the systems generally are designed to provide a representation of whether two points are level, one with respect to the other.

Contrawise, the present invention includes as an object a feature whereby relative elevations at a plurality of positions horizontally spaced along the base or frame of a trailer are visually indicated to facilitate leveling of the trailer during setup.

Further it is an object of the present invention to provide a measuring system which includes a feature whereby deviations from the initial plane of level are indicated at a plurality of positions spaced along the base or frame of a trailer.

It is another object of the present invention to provide a measuring system for facilitating the correction of deviations from level of a trailer which result from settling.

Another object of the present invention is to provide such a measuring system which can be readily and inexpensively manufactured and maintained.

DISCLOSURE OF THE INVENTION

Other objects and advantages will be accomplished by the present invention which provides a trailer measuring system for facilitating the initial leveling of a trailer during setup and for indicating deviations of the trailer from an initial position of level at a plurality of horizontally spaced locations. The system includes a plurality of vertically disposed measuring tubes which can be installed at a plurality of horizontally spaced locations along the base or frame of a trailer. Fluid communication is provided between the measuring tubes proximate their lower portions in a closed system. Fluid communication is also provided between the measuring tubes proximate their upper portions in a closed system. The measuring tubes, and, therefore, the means for providing fluid communication between the tubes proximate their lower portions, are partially filled with a selected amount of liquid. In the preferred embodiment, the amount of liquid is selected such that the level of liquid marks each of the vertically disposed measuring tubes proximate their vertical midpoint when all such measuring tubes are at the same elevation. Each of the tubes serves as a measuring instrument which acts in conjunction with the level of liquid contained therein to provide an indication of elevation of the trailer proximate the position of the measuring tube relative to the position of the trailer proximate each of other measuring tubes. When the measuring tubes are secured to the trailer with their lower portions positioned at the same distance from the plane (typically the floor) of the trailer desired to be leveled, the liquid level will mark the same point along the vertical axis of each of the measuring tubes when the trailer is level. In the preferred embodiment, each of the measuring tubes are provided with indicia means for measuring or recording the point along the length of the tube which is marked by the liquid level therein.

In the preferred embodiment, a reservoir is provided which can be positioned at a location horizontally spaced from the measuring tubes. Means for selectively providing fluid communication between the bottom of the reservoir and the lower portions of the measuring tubes are provided, as well as means for selectively providing fluid communication between the top of the reservoir and the upper portions of the measuring tubes, in a closed system. The reservoir is filled with liquid to a level such that, when fluid communication is provided between the reservoir and the measuring tubes, the liquid level will mark each of the measuring tubes at an equilibrium or reference level mark when the trailer is at an initial desired position of level. The reservoir is secured above the around or other surface upon which the trailer is installed separately from the trailer such that the elevation of the reservoir will not vary with changes in level of the trailer. Accordingly, each of the measuring tubes further serves as a measuring instrument which acts in conjunction with the level of liquid contained therein to provide an indication of deviation from an initial position of level, as well as an indication of whether the bottom of a tube is at a higher or lower level with respect to each of the other tubes in the system. In the preferred embodiment, each of the measuring tubes is provided with indicia for indicating the level of liquid contained therein, as well as indicia for indicating whether the tube is at a higher/lower position relative to an initial position of level.

BRIEF DESCRIPTION OF THE DRAWINGS

The above-mentioned features of the present invention will become more clearly understood from the following detailed description read together with the drawings in which.

BEST MODE FOR CARRYING OUT THE INVENTION

Figure 1:
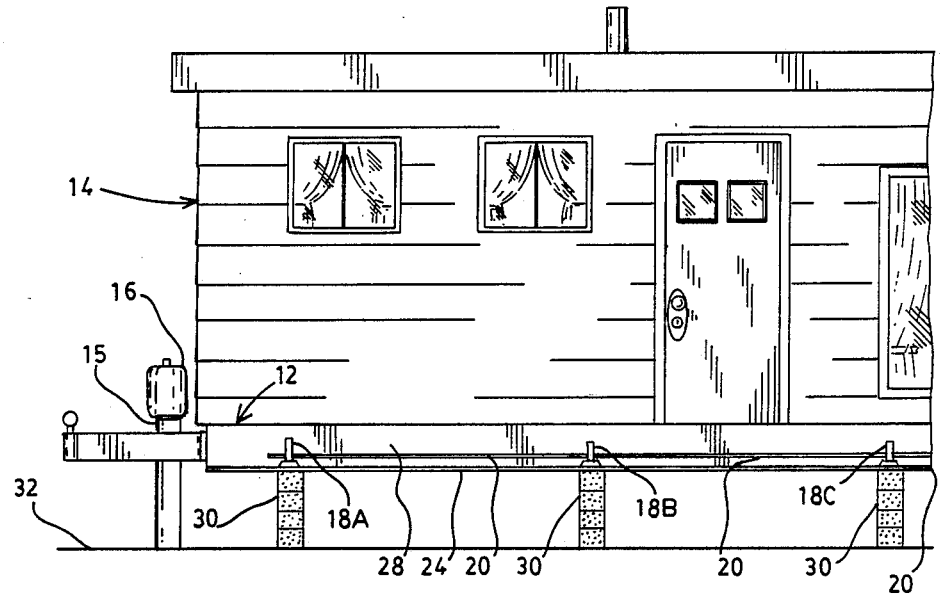
FIG. 1 illustrates a partial front elevation view of a mobile home in which a trailer measuring system constructed in accordance with the various features of the present invention is partially illustrated.
Figure 2:
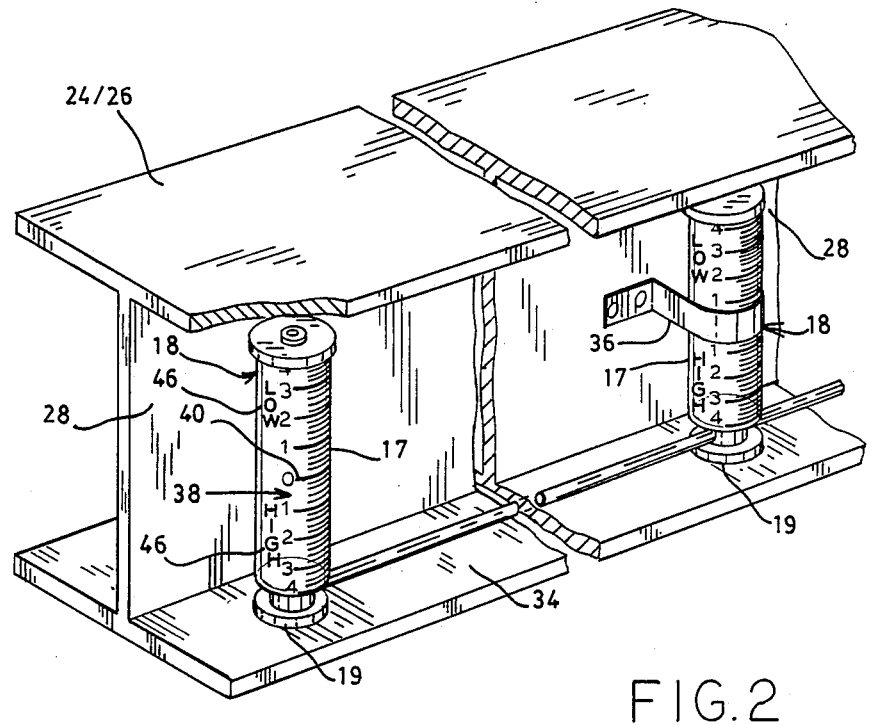
FIG. 2 illustrates a partial perspective view of a trailer measuring system constructed in accordance with the various features of the present invention. A portion of a trailer frame is shown to illustrate a typical installation of the device.
Figure 3:
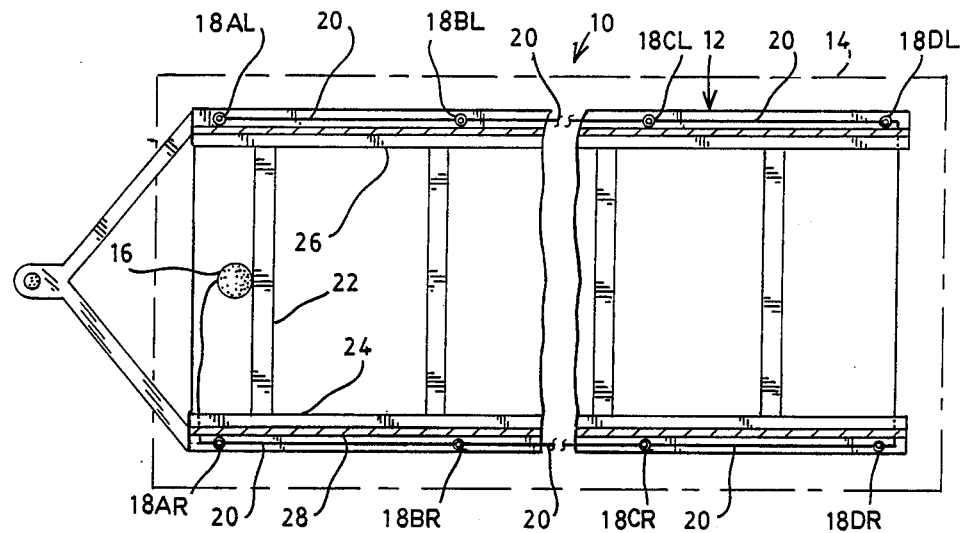
FIG. 3 illustrates a partial plan view, in section, of a mobile home in which a trailer measuring system constructed in accordance with the various features of the present invention is partially illustrated.

A trailer measuring system incorporating various features of the present invention is illustrated generally at 10 in the figures. A portion of the I-beam frame 12 of a mobile home 14 is shown in FIGS. 1-3 to illustrate a typical installation of the system 10. Although the embodiment of the present invention described herein is shown and described as it could be used with a mobile home, it will be understood that the present invention is for a system which can be used with many other kinds of trailers.

It will be appreciated by those skilled in the art that most mobile homes, as well as many other types of trailers, are provided with an I-beam or other type frame which forms the base of the trailer. In mobile homes, this frame is generally located beneath the floor of the home and is usually provided with wheels or means for attaching wheels to permit towing of the home to the location where it is to be permanently (or semi-permanently) installed. When the mobile home is "set up", the home is installed above the ground or other surface by securing pillars between the ground and the bottom surface of the frame. The frame, and therefore the floor of the home, can be leveled by adjusting the height of the pillars which are spaced along the frame, typically on twelve foot centers. Known methods and apparatus can be used to level the mobile home (or other type trailer) during this initial installation.

The trailer measuring system 10 includes a reservoir 16 and a plurality of measuring instruments 18. For the purposes of this description, the individual measuring instruments 18 are designated in the drawings with capital letter suffixes, i.e. 18A, 18B, 18C, etc. Fluid communication is provided between the lower portion of the reservoir 16 and the lower portions of the measuring instruments 18 by a plurality of lengths of flexible tubing 20 In the preferred embodiment, as illustrated in FIG. 3, the reservoir 16 and the measuring instruments 18 are connected in series by the lengths of tubing 20. In the preferred installation of the system 10, the reservoir 16 is placed on or secured to a pillar 15 or other kind of upright stanchion which extends vertically from the ground 32 or other surface upon which the trailer is installed. The height of the pillar 15 is selected such that the reservoir 16 is supported at approximately the same elevation as the measuring instruments 18. The pillar 15 is separate from the pillars 30 which support the trailer and does not support any weight other than its own and that of the reservoir 16. Therefore, the elevation or level of the reservoir 16 will be unaffected by changes in level of the trailer due to settling. Referring to FIGS. 1-3, the measuring instruments 18 are secured to the I-beams 24/26 proximate the outboard vertical face 28 of the I-beams 24 and 26 above each of the pillars 30 which support the trailer above the ground 32 or other surface. Referring to FIG. 2, the measuring instruments 18 can be secured to the I-beams by securing the base 19 of the instrument 18 to the horizontal surface 34 of the I-beam with conventional adhesive means or by providing a magnet in the base 19, and/or by a spring clip 36 which is secured to the outboard vertical face 28 of the I-beams 24/26. The spring clip 36 shown in FIG. 2 is the preferred method for securing the measuring instruments 18 to the I-beams, because it permits vertical adjustment of the instruments 18, the importance of which will be discussed in greater detail hereinbelow.

Each of the measuring instruments 18 include liquid level indicia, shown generally at 38 in FIG. 2. The indicia 38 comprise a plurality of horizontal lines spaced along the vertical length of the upstanding tube portion 17 of the instrument 18, and include a zero or equilibrium level line 40 positioned at the approximate vertical mid-point of the tube 17. Preferably, numerical indicia are provided at equally spaced locations above and below the equilibrium level line 40, indicating the relative vertical displacement from the equilibrium level.

After the trailer has been set up and leveled using conventional leveling means, the reservoir 16 is filled with a liquid such as water. A valve 44, which is provided proximate the bottom portion of the reservoir for controlling the flow of liquid to the measuring instruments 18, is opened to permit the liquid to flow from the reservoir to the first measuring instrument 18A through the length of tubing 20 communicating between them. The upstanding tubes 17 of the measuring instruments 18 are vented at the top to accommodate changes in the volume of air in the tubes due to variations of the liquid level in the tubes and to help minimize air bubbles in the tubing 20 which provides fluid communication between the measuring instruments 18. After the liquid level in the reservoir 16 and each of the measuring instruments 18 reaches equilibrium, liquid is added to or drained from the reservoir until the liquid level in the highest measuring instrument 18, i.e. the one in which the liquid level is the lowest, marks the zero or equilibrium level mark 40 of the instrument. In the preferred embodiment, this highest instrument 18 will be predetermined by providing one of the instruments, preferably either the first or last instrument in the series of instruments 18, with a substantially thicker base portion which raises the bottom of the instrument above the level of that of the other instruments 18 in the series when each of their bases contact the surface 34 of the I-beam to which they are secured (after the trailer has been initially leveled). This predetermined highest instrument preferably is secured to the I-beam surface 34 with an adhesive or magnetic base. After the liquid level in the highest instrument 18 has been adjusted to the zero mark 40 as described, each of the remaining instruments 18 is raised until the liquid level in each matches that in the predetermined highest instrument. After adjustment, each of these remaining instruments 18 will be held in the equilibrium position by the spring clip 36 which secures the instrument to the I-beam 24/26. It will be appreciated by those skilled in the art that the liquid level in the reservoir and the predetermined highest instrument will be increased in very small increments as each of the other instruments 18 in the series is raised to match the level in the highest instrument; this can be compensated for by draining a small amount of liquid from the reservoir 16 to lower the liquid level in all of the instruments until it marks the zero level mark 40 of each of the instruments (after the previous step of adjusting all of the instruments to the same level has been completed). Alternatively, the indicia 38 (including the equilibrium level mark 40) may be carried by a separate vertically adjustable member that is adjusted up or down in each instrument 18 until the liquid level in the tube 17 marks the equilibrium level mark 40 when the trailer is set up at its initial position of level.

After the trailer has been initially set up and leveled and the trailer measuring system 10 installed and calibrated as described above, the measuring instruments 18 will provide visual indication of deviations from the initial position of level due to settling of the trailer. Indicia 46 is carried by the tubes 17 of the instruments 18 for indicating whether each individual instrument 18 is higher/lower than the reservoir 16 and each of the other measuring instruments 18 relative to an initial position of level. Because the reservoir 16 is placed on a pillar 15 separate from the trailer, the level of the reservoir 16 with respect to the ground will not change appreciably due to settling. In the preferred embodiment, the diameter of the reservoir 16 is several times that of the measuring instruments 18. Accordingly, the decrease in liquid level in the reservoir 16 due to an increase in level in one or more of the measuring instruments 18 as a result of settling of the trailer is negligible. Therefore, the indicia 38 carried by the measuring instruments 18 can be calibrated to indicate deviations from level in standard units of measure. Because the instruments 18 are located above the pillars, such deviations can be readily corrected by using shims to increase the effective height of the pillars where the instruments indicate that the settling has occurred.

Figure 4A:
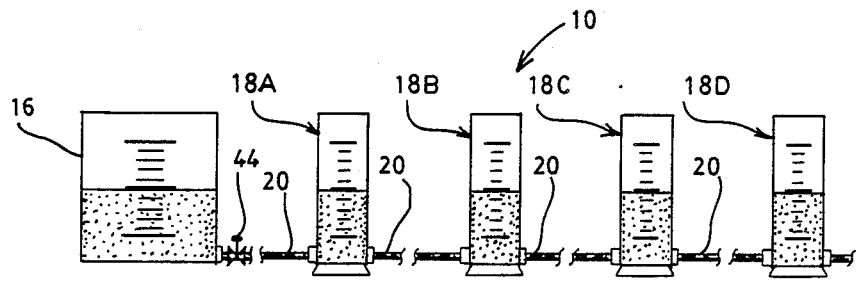
FIGS. 4A and 4B diagrammatically illustrate the functioning of a trailer measuring system constructed in accordance with the various features of the present invention.
Figure 4B:
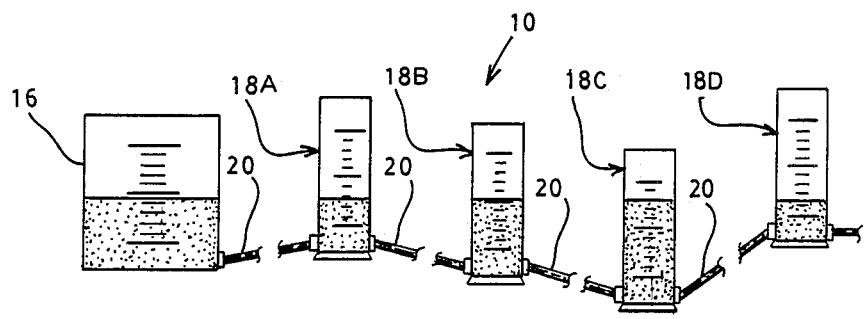

Referring to FIGS. 4A and 4B, FIG. 4A diagrammatically illustrates how the liquid levels in the reservoir 16 and the measuring instruments 18 would appear when the bottom of each were at the same level, i.e. after initial installation and calibration. FIG. 4B illustrates the change in liquid level which would occur in each measuring instrument 18 as a result of the illustrated changes in relative elevation of the measuring instruments 18 and the reservoir 16. It can be seen from this figure that the liquid level will rise in the instruments 18 which are located above pillars which have settled, and that the liquid level will fall in those instruments 18 whose elevation with respect to the reservoir 16 increases (due to settling of the trailer in the vicinity of the location of the reservoir). Normally, the trailer can be releveled by shimming the pillars up at the points of decreased elevation to decrease the level of the liquid in the instrument located above them until it matches the level in the highest instrument.

Figure 5:
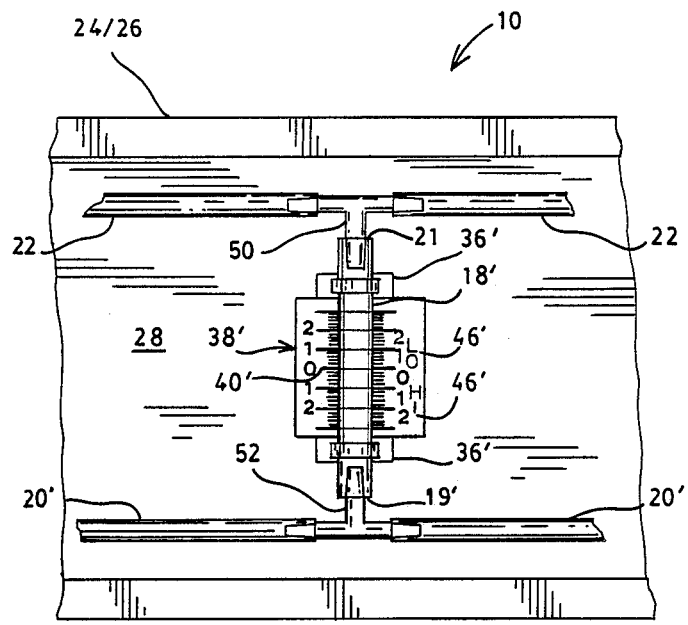
FIG. 5 illustrates a partial front elevation view of an alternate embodiment 10' of a trailer measuring system constructed in accordance with various features of the present invention.
Figure 6:
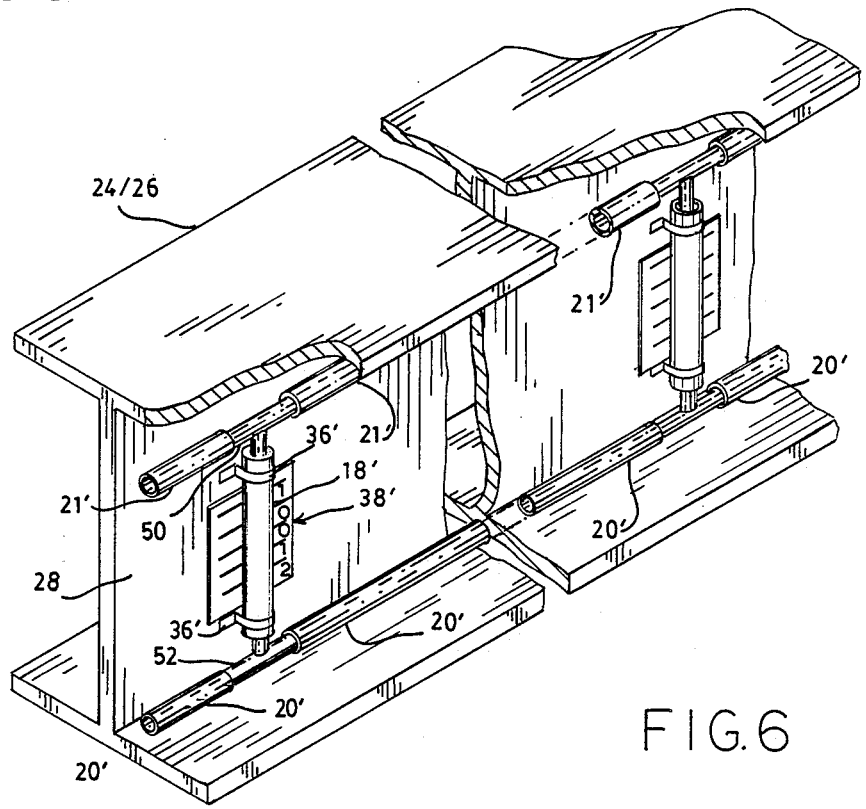
FIG. 6 illustrates a partial perspective view of the alternate embodiment 10' of a trailer measuring system constructed in accordance with the various features of the present invention. A portion of a trailer frame is shown to illustrate a typical installation of the device.
Figure 7:
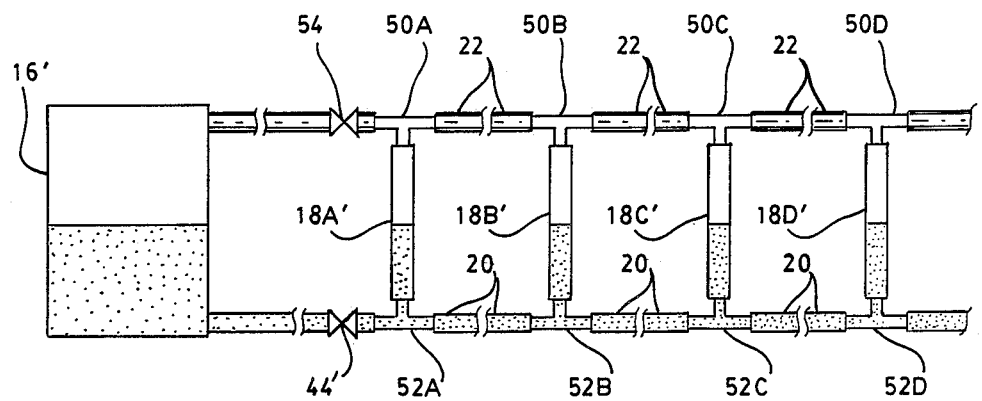
FIG. 7 diagrammatically illustrates the functioning of the alternate embodiment 10' of a trailer measuring system constructed in accordance with the various features of the present invention.

Referring now to FIGS. 5–7, an alternate embodiment 10' of the trailer measuring system of the present invention is disclosed. The system 10' provides an improved means for accomplishing the initial leveling of a trailer during setup, while still having the capability of indicating deviations from the initial position of level which result from settling of the trailer. For convenience in describing the system 10', various elements of the system are referenced with prime numerals which correspond to elements of the system 10 disclosed in FIGS. 1–4 which perform a similar function.

The system 10' includes a plurality of substantially identical vertically disposed liquid containing measuring tubes 18' which can be secured to the vertical face 28 of the I-beams 24 and 26 with clip means 36' as shown in FIGS. 5 and 6. The number of measuring tubes 18' can be varied according to the size of the trailer and normally one will be provided for each pillar upon which the trailer is set up as shown in FIG. 1 for the measuring instruments 18 in the system 10 described above. Fluid communication is provided between the measuring tubes 18' proximate their lower portions 19' by lengths of tubing 20' and T-shaped fittings 52. Unlike the system 10 described above, the measuring tubes 18' of the system 10' are not vented to the atmosphere. Instead, fluid communication is provided between the measuring tubes 18' proximate their upper portions 21 by lengths of tubing 22 and T-shaped fittings 50 in order to maintain the same pressure proximate the upper portions of the measuring tubes 18' while preventing contaminants such as debris, insects and the like from entering the system. The measuring instruments 18' can be connected together, in fluid communication, in either series, parallel, or series-parallel to form a closed system.

In order to reduce manufacturing costs and simplify construction, the measuring tubes 18' and the connecting tubes 20' and 22 can be constructed of the same size and type, preferably clear and flexible, tubing.

A reservoir 16, is provided by the system 10' and can be positioned in a manner similar to the reservoir 16 in the system 10 described above and shown in FIGS. 1–4. Fluid communication is provided between the lower portion of the reservoir 16' and the lower portions 19' of the measuring tubes 18' via an isolation valve or other type fitting 44'. Fluid communication is provided between the upper portion of the reservoir 16' and the upper portions 21 of the measuring tubes 18' via an isolation valve or other type fitting 54.

Each measuring tube 18' in the system 10' is provided with indicia means 38' for indicating the level of liquid in the tube 18'. In the preferred embodiment, the indicia 38' comprises a flexible magnetic strip which can be positioned under the measuring tube 18' on the vertical face 28 of the I-beam 24/26 as shown in FIG. 5. The indicia 38' can include indicia 46' for indicating whether the tube 18' is at a higher/lower elevation relative to an initial position of level in a manner similar to that described for the system 10 above.

In the preferred application of the system 10', the system, except for the reservoir 16' is installed on the trailer, e.g. the I-beam frame of a mobile home, during the manufacture of the trailer. The system 10' is filled with the amount of liquid such that the liquid level in each measuring tube 18' will mark the zero reference line 40' of each tube when the trailer is level (with the isolation valve/fittings 44'/54 closed). The amount of liquid required can be calculated by those skilled in the art for each application. When the trailer is being set up, the laborers performing the work can level the trailer by simply shimming the pillars 30 until the zero reference line 40' in each measuring tube 18' is marked by the liquid level contained therein. No special skill is required by the laborers performing this task; a minimal amount of instruction in use of the system 10' will suffice. After the trailer has been set up and leveled, the reservoir 16' can be connected to the system via the isolation valve/fittings 44'/54 which are opened after the reservoir 16' is connected. Liquid is then added to the reservoir until the liquid level in each of the measuring tubes 18' marks the zero reference line 40'. Subsequent deviations from the initial position of level due to settling will be indicated by the liquid level in each of the measuring tubes 18'. Because the cross-sectional area of the reservoir 16' is several times that of the measuring tubes 18', the changes in liquid level in the reservoir 16' will be negligible in relation to the changes in the measuring tubes 18'. Accordingly, the measuring tubes will provide a substantially accurate indication of the amount of correction required to correct for deviations from the initial position of level due to settling proximate each measuring tube 18'.

In light of the foregoing, a trailer measuring system 10 has been provided wherein the measuring instruments 18 provide a visual indication of diviations from an initial position of level at spaced locations along the frame 12 of a trailer 14. The instruments 18 of the system 10 indicate which pillars 30 upon which the trailer 14 is installed need to be shimmed to correct for the indicated deviations from level. Further, the instruments 18 of the system 10 provide indication of when the corrections made have returned the trailer to the desired position of level.

Further, a system 10' has been provided which simplifies the process of leveling a trailer during setup, while still providing a visual indication of deviations from an initial position of level at spaced locations along the frame 12 of a trailer 14 as in the system 10. Because the system 10' is a closed system, it is unaffected by contaminants in the atmosphere such as debris and insects and the liquid contained within the system is substantially immune to evaporation from the system.

While a preferred embodiment has been shown and described, it will be understood that it is not intended to limit the invention to such disclosure, but rather it is intended to cover all modifications and alternate constructions falling within the scope of the invention as defined in the appended claims.

I claim:

1. A trailer measuring system for mounting on the lower supporting frame of a trailer, for leveling such trailer during set up and/or continuously monitoring deviations from an initial level position, said system comprising:

a plurality of selectively spaced, substantially upright liquid containing measuring tubes secured to said lower frame, each said measuring tube having an upper end portion and a lower end portion;

means for providing fluid communication between said measuring tubes proximate and lower and portions by said measuring tubes;

means for providing fluid communication between said measuring tubes proximate said upper end portions or said measuring tubes, said measuring tubes and said means for providing fluid communication between said tubes proximate their upper end portions and between their lower end portions defining a closed volume;

indicia means operatively associated with each said measuring tube for indicating the liquid level within said measuring tubes, whereby the volume of liquid contained by said system can be preselected such that a user can discern, from the liquid level in said measuring tubes, when said trailer is level and whereby a user can discern, from changes in the level of liquid in said measuring tubes, deviations from an initial position of level of said trailer proximate said measuring tubes, said indicia means including at least an equilibrium level mark; and means for adjusting the vertical position of each said indicia means relative to said measuring the operatively associated therewith, whereby the vertical position of said equilibrium level mark can be adjusted to indicate the level of liquid in said measuring tube operatively associated therewith, said means for adjusting the vertical level of said indicia means including a flexible magnetic strip with said indicia means provided thereon for magnetically engaging said lower support frame proximate said measuring tube operatively associated therewith.

* * * * *